UNITED STATES PATENT OFFICE.

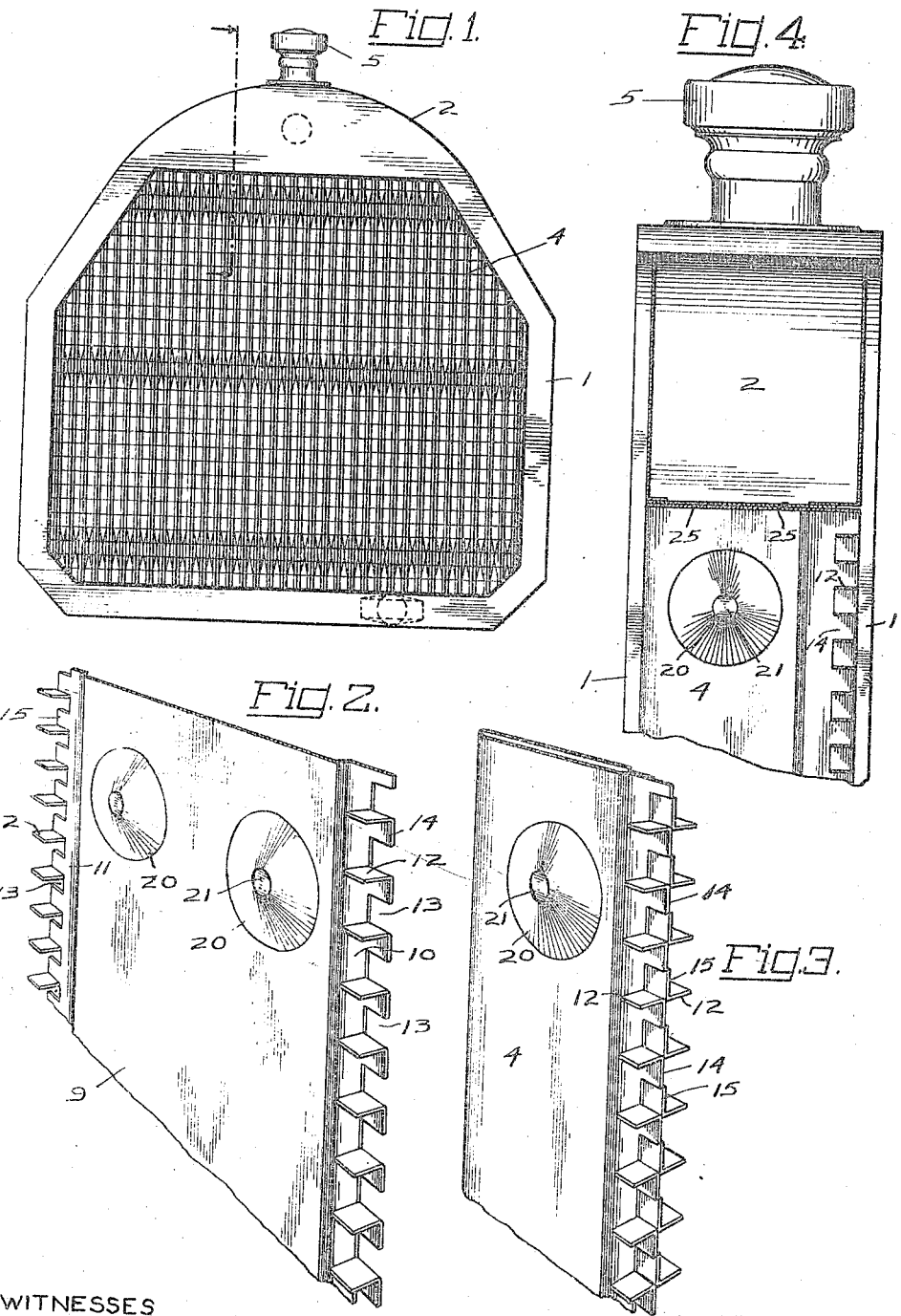

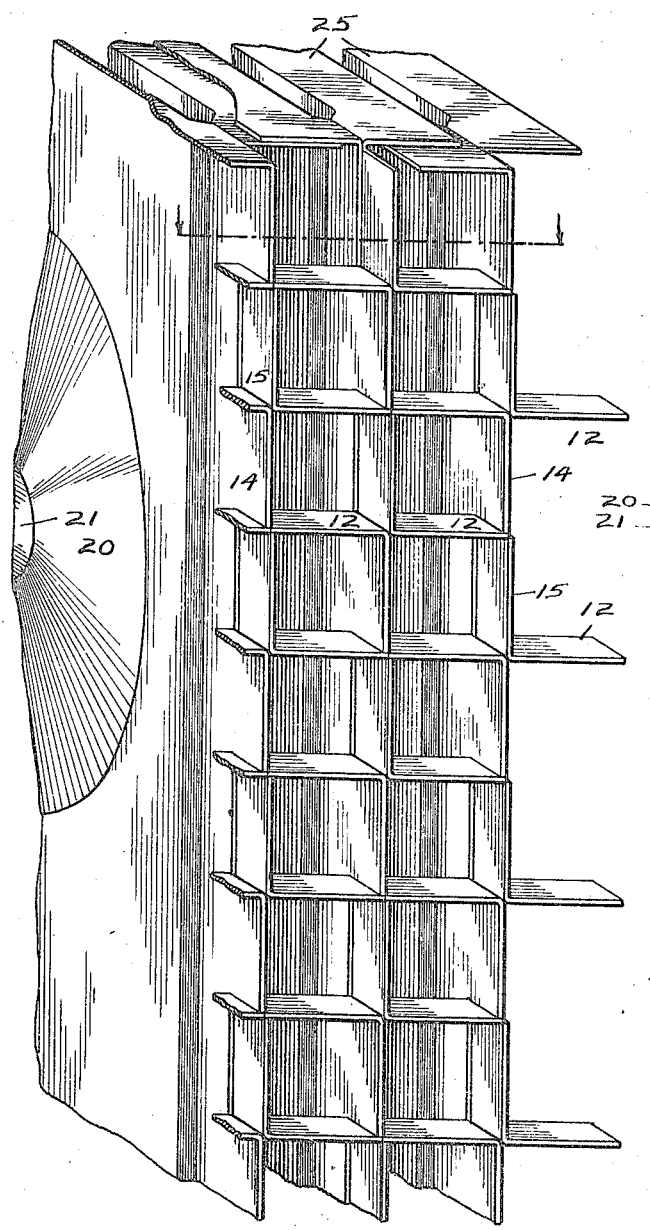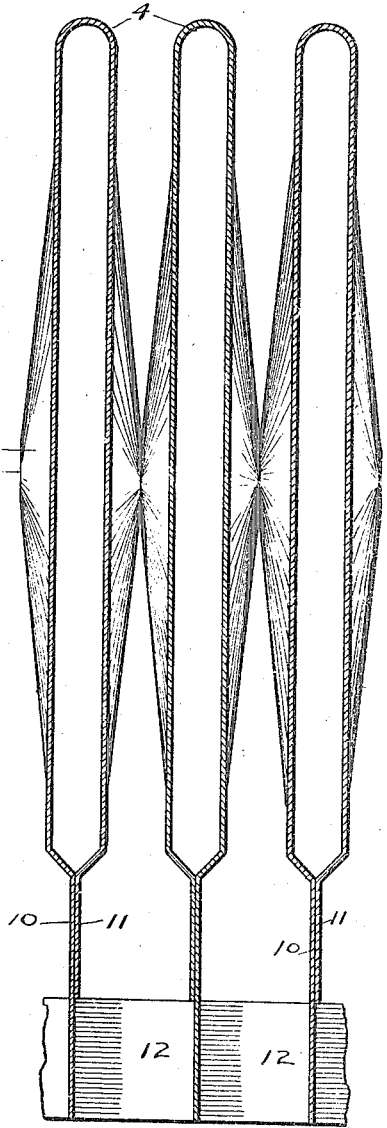

THOMAS J. KEHOE, OF TOLEDO, OHIO.

RADIATOR.

1,190,424.

Specification of Letters Patent.   Patented July 11, 1916.

Application filed February 15, 1915. Serial No. 8,225.

*To all whom it may concern:*

Be it known that I, THOMAS J. KEHOE, a citizen of the United States, and a resident of Toledo, in the county of Lucas and State of Ohio, have invented a certain new and useful Radiator; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to automobile radiators and its has for its object to provide a radiator wherein the parts may be easily made and at a low cost of production.

It also has for its object to so connect the parts of the radiator that they may be easily removed when repair thereof is necessary.

The radiators involving my invention are formed of a plurality of strips which are bent centrally to produce water cells or conduits. They are then sealed along the edges which are thus brought together. Spacing means are also formed in the strips so that when the strips are placed in parallel relation the spacing means will be so located as to maintain the cells in spaced relation to permit air to freely pass between the walls of the cells. The construction also is such that if one of the cells needs repair, all that is necessary is to melt the solder along the points of contact or connection with the other parts of the radiator, to remove the cell and such alterations or repairs may be made in the cell as may be deemed advisable. The cell may then be replaced and re-soldered in position. Also, by my invention a radiator is produced wherein the water cells are sealed and secured together by a very little solder, thereby greatly reducing the cost of production. By my invention the radiator may be soldered by dipping one side so as to bring the solder into contact with the edges of the walls of the cells which have been folded or brought together. A spacing means is also provided for properly spacing the edges of the walls while they are being subjected to the soldering, and which also give the cellular appearance to the front of the radiator.

The invention may be contained in many forms of condensers, heaters, coolers and heat radiating devices usable for different purposes, all of which come within the purview of my claims hereinafter appended. To show the practicability of my invention I have selected one of such constructions as an example and shall describe it hereinafter. The construction selected is illustrated in the accompanying drawing.

In the drawings, Figure 1 illustrates a front view of the radiator. Fig. 2 illustrates a part of one of the strips of which a water cell is formed. Fig. 3 illustrates a strip bent and the cell formed. Fig. 4 illustrates a section of the upper compartment of the radiator. Fig. 5 illustrates an enlarged view showing the manner in which the flanges are bent and formed to close and securely fasten the cells together. Fig. 6 illustrates an end sectional view of the part of the radiator shown in Fig. 5 showing the means whereby the cells are spaced apart and held in position.

1, Fig. 1, is the framework of the radiator. It is provided with the usual upper compartment 2 and the lower compartment 3. The water from the engine enters the upper compartment and passes down through the water cells 4 to the lower compartment 3, thence it passes to the jacket of the engine, the circulation being caused by the difference in temperature and consequently the difference in the weight of the water in the two parts of the circuit, it being heated by the engine and cooled by the radiator. The usual cap 5 is also provided for filling the radiator and the jacket of the engine.

The water cells 4 are made of strips 9 sufficiently long to extend from the upper compartment 2 to the lower compartment 3. They are made shallow trough-shaped and formed with flanges 10 and 11. The flanges are cut so as to form tongues 12. The tongues 12 are bent so as to extend at right angles to the plane of the outer surface of the strip 9 leaving thereby spaces 13 in the flanges and forming tongues 14 and 15. The tongues 12 of one flange are cut opposite the spaces of the other flange and the tongues 12 of one edge are bent up and the tongues 12 of the other edge are bent down so that when the strips 4 are folded along their central portion so as to bring the side edges together, the tongues 14 and 15 cover the spaces 13, as shown in Fig. 3, leaving the tongues 12 extending laterally and oppositely. Also each oppositely disposed pair of tongues will be located in the same plane.

The cells thus formed are placed side by side. They are spaced by raised portions 20 which are formed in the stamping of the strips 9. The raised portions 20 may be made in any suitable shape, but they are preferably made frustumal whereby a flat contact surface 21 is formed on each raised portion. The contact surfaces or raised portions are placed in thrust relation to similar contact surfaces or raised portions of the adjoining cells. The cells are thus held in spaced relation. The cells are so cut and located that the tongues 12 of each cell which extend transversely to the edges of the cells, will be located intermediate the tongues 12 of the adjoining cells and so as to be placed intermediate the edges of the tongues 14 and 15 of opposite edges of the folded strip, as shown in Fig. 5.

The ends of the strips are bent to form laterally extending flanges 25 which overlap when the cells are placed in position as shown in Fig. 5.

The cells are placed in position and locked and dipped in solder to a depth sufficient to completely cover the edges of the strips 9, that is, the side edges of the cells 4. The structure thus formed is secured in position in the radiator between the two chambers.

The air passing in between the cells as the water passes down through the cells, carries the heat of the water away and reduces the temperature of the water.

The construction selected and described may be greatly varied in the arrangement and manufacture of its parts and in the substitution of elements having equivalent functions, and such modifications may be used for many varied purposes and still contain the invention.

Having thus described my invention, what I claim as new and desire to secure by Letters Patent, is,—

1. A radiator having a plurality of vertically disposed cells, each cell having on each side thereof and at the upper and lower ends thereof frustumal bulged portions, the outer ends of the frustumal bulged portions forming flat abutting surfaces which abut the outer ends of the frustumal bulged portions of the adjoining cells, forming thereby intermediate spaces for the movement of air currents between the cells in directions transverse to the cells, the said cells mounted in a frame having water chambers communicating one at the upper ends of the cells and the other at the lower ends of the cells.

2. A radiator having a plurality of cells, the cells having frustumal bulging portions for spacing the cells, the said bulging portions of each cell abutting the bulging portions of the adjoining cells, and means for spacing the edges of the cells and securing the edges in their spaced relation.

3. A radiator having a plurality of cells, the cells having a pair of circular bulge portions formed in the opposite sides of each cell and near the upper and lower ends of the cell, and located centrally with respect to the front and rear edges of the cell and means for spacing the edges of the cell.

4. A radiator having a plurality of cells, the cells having a pair of frustumal bulged portions formed in the opposite sides of each cell near the upper and lower ends of the cell, and located centrally with respect to the front and rear edges of the cell, and means for spacing the edges of the cells and securing the edges in their spaced relation.

5. A radiator having a plurality of vertical cells formed by folding strips along central vertical lines, the strips having tongues at their edges forming thereby spacing tongues extending laterally from the edges of the cells for spacing the edges of the cells, the cell walls having bulged portions for spacing the cells in the radiator.

6. A radiator having a plurality of parallel cells, each cell having sealing flanges extending outwardly in the central plane of the cell, the sealing flanges having oppositely disposed spacing tongues for spacing the edges of the cells and giving a cellular appearance to the radiator.

7. A radiator having a plurality of parallel cells, each cell having sealing flanges extending outward in the central plane of the cell, the sealing flanges having oppositely disposed spacing tongues cut in and bent from the planes of the flanges and extending in horizontal planes, the spaces in the flanges formed by bending the tongues being located alternately along adjoining flanges of each cell and covered by the other of the two flanges.

8. A radiator having a plurality of parallel cells, each cell having sealing flanges extending outward in the central plane of the cell, the sealing flanges having oppositely disposed spacing tongues for spacing the edges of the cells and giving a cellular appearance to the radiator, the walls of the cells having frustumal bulges for spacing the cells.

In testimony whereof, I have hereunto signed my name to this specification in the presence of two subscribing witnesses.

THOMAS J. KEHOE.

Witnesses:
F. E. AUL,
E. E. THOMAS.